3,067,174
POLYGLYCIDALDEHYDE

William J. Sullivan, Oakland, Calif., assignor to Shell Oil Company, New York, N.Y., a corporation of Delaware
No Drawing. Filed Mar. 7, 1960, Ser. No. 12,902
7 Claims. (Cl. 260—67)

This invention relates to polymers of glycidaldehyde and alkyl substituted glycidaldehyde which are characterized by containing a relatively large number of epoxy groups. The present invention also relates to a method of preparing such polymers.

Polyepoxides are an important class of resins which are finding more and more applications as adhesives, surface coatings, castings and the like. Resinous materials of this type which are easily prepared and which contain a comparatively high number of epoxy groups are desirable. The resins having a high concentration of epoxides are particularly valuable in that they may be more easily cured those those containing less functionality. Many types of curing agents are satisfactory, less expensive, therefore cheaper curing agents can be used to provide the desired cured resin. For example, diethylene triamine is required to cure epoxides with lower functionality while ethylene diamine is suitable for curing epoxy resins with high functionality. In addition, the highly functional epoxy resins provide a tighter and better cure which results in improved products.

The present invention provides polymers which are either liquid or solid depending upon the polymerization conditions. The solid polymer is suitable for making shaped objects and the liquid polymer is particularly suitable for the treatment of paper, textiles and such materials and as a functional epoxide diluent. It has now been found that such polymers may be obtained by polymerizing compounds having the formula

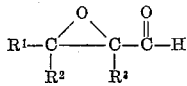

where $R^1$, $R^2$ and $R^3$ are selected from the class consisting of hydrogen and alkyl groups having from 1 to 8 carbon atoms in the presence of a catalyst capable of promoting an anionic type polymerization. More particularly, the catalyst is selected from the class consisting of tertiary amines, quaternary amines, secondary amines and metal hydroxides. By the above process, polymers are obtained having an epoxy equivalence above 0.2 equivalent per 100 grams polymer, and may be obtained which contains a sufficient concentration of epoxy groups that the epoxy equivalence is greater than 0.5 gram equivalent per 100 grams of polymer. In fact, when glycidaldehyde is polymerized in accordance with this invention, it is possible to obtain polymers having as high at 0.9 equivalent per 100 grams of polymer or higher. Thus it is seen that the present invention provides polymers which are highly functional in regard to epoxide groups.

The monomers which may be used in the present invention are given by the formula mentioned above, and the preferred monomer is glycidaldehyde. However, the glycidaldehyde may be substituted with alkyl groups. Preferably, there will only be one alkyl group rather than two or three and the fewer the carbon atoms in the entire monomer, the better is the resulting polymer from the standpoint of high functionality. Thus glycidaldehyde would be preferred and next preferred would be 4 carbon monomers such as 2,3-epoxy butrylaldehyde. Other monomers capable of polymerizing in accordance with this invention include 2,3-epoxy-2-methylbutyrlaldehyde, $\alpha,\beta$ epoxy pentonal, and $\alpha,\beta$ epoxy hexanal. In general, the monomer may contain up to, say, 18 carbon atoms or more. Preferably the monomer will contain less than 10 carbon atoms in order to provide the desired high functionality in regard to epoxy groups.

Any alkyl group may be used for $R^1$, $R^2$ or $R^3$ such as methyl, ethyl, propyl or isopropyl and the alkyl groups may be the same or different when there is more than one.

The monomers of the present invention may be readily prepared by the epoxidation of alpha,beta unsaturated aldehydes such as acrolein, alpha-methylacrolein, crotonaldehyde, methylcrotonaldehyde, tiglic aldehyde, citral, cinnamylaldehyde. These monomers are obtainable by epoxidation of the corresponding unsaturated aldehydes in known or special methods, for example, that shown in the copending application of George B. Payne, Serial No. 738,943 now U.S. Patent 2,947,761, filed June 2, 1958.

Preferably water is removed by any suitable method so that the epoxyaldehyde will contain only small amounts of water when it is to be used for the present invention. Although it is not necessary to remove all of the water, anhydrous grades of epoxyaldehydes give the best results when polymerized in accordance with the present invention. The presence of water causes severe loss of epoxy groups if more than, say, 5% of the mixture is water, and undesirable losses when the amount of water is not less than 1%. As indicated above, any water is harmful and small amounts have a correspondingly adverse effect on the functionality of the final polymer. However, it is believed that very small amounts of water of the order of, say, 100 parts per million may even be necessary. Such trace amounts will always be present as a practical matter, and the term anhydrous means that the water is held to a minimum.

As mentioned above, the catalyst required in the polymerization should promote an anionic type polymerization. Ammonia and primary amines do not provide the desired highly epoxidized polymer. Secondary amines tend to produce tertiary amines and thereby catalyze the desired polymerization. An example of a secondary amine which polymerizes glycidaldehyde is diethylene-triamine. Tertiary amines are quite suitable and tertiary amines such as pyridine, triethylamine, benzyldimethylamine and benzyldiethylamine, quarternary amines such as Triton B (benzyltrimethyl ammonium hydroxide) and secondary amines are preferred where a solid polymer is desired. Basic metal hydroxides also provide polymeric products but the molecular weight is generally lower than that of the tertiary or quaternary amines mentioned above. In general, alkali metal hydroxides belong to a less preferred class because materials are formed having undesirable colors, while excellent liquid polymers are obtained with alkaline earth hydroxides such as calcium, barium and strontium. Thus if a liquid polymer having more than, say, 5 monomer units is desired, the preferred catalyst will be an alkaline earth metal hydroxide, while if a higher molecular weight solid polymer is desired, the amine catalysts mentioned above would be preferred. However, by controlling such other variables as time and temperature, solid polymers can be obtained from metal hydroxides and amines can likewise give lower molecular weight polymers if desired.

The reaction is conducted by bringing the monomer and catalyst together in a reactor and the reaction usually proceeds smoothly at moderate temperatures. The amount of catalyst used is generally kept down to as small an amount as is necessary to provide the desired degree of polymerization and will usually be within the range of, say, 0.01 to 5 parts per 100 parts of monomer. Larger amounts of catalyst would be operable, but have the disadvantage of tying up excessive monomer by side reactions.

As indicated above, normal temperatures of, say, about 20° C. are preferred, and generally the reaction temperature will be held within the range of about −10° to 60° C. depending upon the reactivity of the system. Although lower and higher temperatures are nevertheless operable, excessively high temperatures are to be avoided in order to avoid partial curing of the product resin, and excessively low temperatures are impractical both from the standpoint of reaction rate and the necessity of cooling facilities. However, when the reaction mixture is slow to react, temperatures as high as the boiling point of the system may be used, and when the reaction mixture is highly reactive, temperatures below −90° C. are advantageous at the beginning of the reaction.

Although it is not essential, a solvent which is inert to the reactants may be used to provide further control. Inert hydrocarbon solvents such as benzene, xylene, heptanes and octanes are suitable. It is also considered desirable to conduct the reaction in an inert atmosphere such as nitrogen.

After the reaction is completed, the product resin may be used without further purification since the amount of catalyst is small and need not be removed. Moreover, the residual catalyst may be useful as a part of the curing agent when a catalyst is used which is suitable as such. Thus the solid polymers need only be ground and the liquid polymers may be used as is. When a solvent is used, it is only necessary to distill the solvent off or flash it off at reduced pressures. If desired, further purification may be achieved by any of the known methods for purifying compounds.

As mentioned above, the polymers of this invention are characterized by having an epoxy content above 0.2 equivalent per 100 grams. The polymer may also contain aldehyde units in addition to the epoxy groups. It is also found that some of the epoxy groups are lost during the polymerization so that the theoretical epoxy equivalence is not obtained. For example, the maximum theoretical equivalency for polyglycidaldehyde would be 1.4 equivalents per 100 grams, and the present invention generally provides an equivalence of above 0.9. However, the present invention provides a simple economical process for obtaining these valuable resins characterized by having a high epoxy content.

The present invention also provides copolymers as well as homopolymers. The copolymers are obtained by polymerizing a mixture of the epoxypropionaldehydes of the present invention with other aldehydes. Generally any other aldehyde which does not cause degradation of the epoxy groups may be used. Small quantities of higher molecular weight aldehydes can be copolymerized without lowering the epoxy functionality. In general, the lower the molecular weight of the aldehyde comonomer, the more can be tolerated without greatly reducing the epoxy equivalence. In fact, the mole ratio of other aldehydes may be as high as 2:1 when the other aldehyde is formaldehyde or even acetaldehyde and the epoxy content of the final polymer may still be in excess of 0.5 equivalent per 100 grams. Thus mole ratios in the range of from 0.1 to 2.0 of other aldehyde per mole of epoxypropionaldehyde may be used, and preferably the mole ratio is from 0.1 to 1.0 per mole. When the mole ratio is less than 0.1 to 1, it may be considered as a homopolymer for most practical purposes.

Several chemical structures contribute to the overall composition, and analytical experiments have shown certain of the following units and it is believed that the other units shown below may be present. The various proportions of units vary according to the polymerization used as indicated by the analyses in the examples which are given hereinafter.

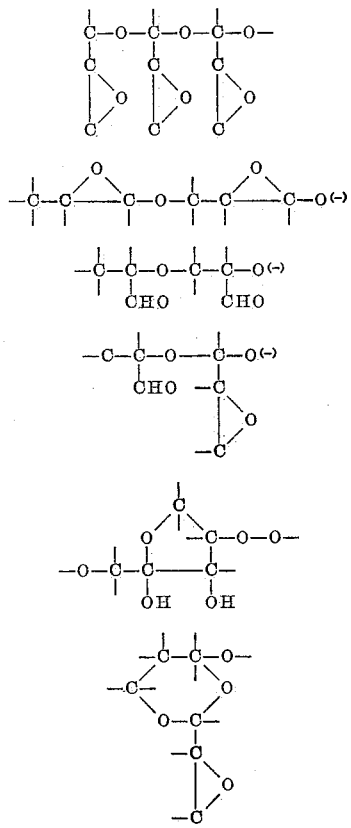

Since aldehydes polymerize to form

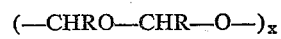

polymers, the two structures are compatible and the aldehyde may be used as a control to provide a resin with the desired number of epoxy groups. The copolymer may also provide a lower cost resin, and may provide a more efficient utilization of the epoxy groups.

In order to prepare the copolymer, it is only necessary to form a solution of the epoxypropionaldehyde and the aldehyde in the desired mole ratio and add catalyst as explained above. When gaseous aldehydes such as formaldehyde are used, the aldehyde may be charged as a gas under a sufficient partial pressure to obtain the desired ratio, or the formaldehyde might be added as paraformaldehyde.

In order to illustrate the invention, the following illustrative examples are given:

*Example I*

36 grams of glycidaldehyde and 0.2 ml. of pyridine were added to a tin can which had been flushed out with nitrogen and sealed against the atmosphere. The mixture was allowed to stand for 4 days at 20° C. in a water bath, after which the solid polymer that had formed was removed and pulverized. The material obtained was somewhat non-homogeneous and one sample had an epoxy value of 0.618 equivalent per 100 grams and another sample had an epoxy value of 0.938 equivalent per 100 grams. The average of these two is 0.733. The example illustrates that glycidaldehyde polymerizes in the presence of pyridine to form a solid polymer having high epoxy functionality.

*Example II*

8.4 grams glycidaldehyde and 0.15 gram of pyridine were allowed to stand for 72 hours at 20° C. in a 6-inch test tube which had been previously flushed with dry nitrogen. Samples were then taken for infrared analysis with the first sample being taken immediately and further samples being taken every two hours for the next ten hours and then every twelve hours for the next two days. During this period increased adsorption was noticed in the 8.4 to 10.5 micron region. There was slight decrease in characteristic epoxide at 10.07, marked decrease in carbonyl at 5.76, an increase of OH at 2.9 and appearance of —C=C— at 6.12.

An analysis of the remainder of the polymer showed carbon 50.1% and hydrogen 5.5% (the theoretical value for C and H in this and the other homopolymers is carbon 50.0% and hydrogen 5.5%). The epoxide value when measured by addition of HCl in dioxane for 15 minutes was 0.569 and when measured for 30 minutes the value found was 0.75; the epoxy value using hydrogen bromide and acetic acid was 0.69. Other analyses showed a hydroxyl content of 0.396, total carbonyl 0.12, a bromine number 3.1 grams per hundred grams, water 2.5 and ester 0.22. In this and other examples, these figures are all given as equivalents per 100 grams. The molecular weight was measured at 1050, but it is believed that the actual molecular weight may be much higher because of difficulties in obtaining the proper solution which in turn may have caused fragments of the polymer to split off and thereby considerably lower the average molecular weight measured.

*Example III*

36 grams of glycidaldehyde and 0.116 of diethylene triamine were mixed together in a tin can previously flushed with dry nitrogen and the mixture allowed to stand two hours at room temperature, then at —20° C. overnight, and then at room temperature for 15 days. A solid material having a pale yellow color was obtained. This material had an epoxide value of 0.802 as shown by treatment with hydrochloric acid in dioxane and titration.

The above obtained polymer was cured by adding 1.4 grams of diethylene triamine to 3.0 grams of pulverized polymer. The polymer immediately dissolved in the amine and the solution immediately underwent a marked increase in viscosity. Within 3 minutes the product was a hard, tough mass which was bound firmly to the metal dish in which it was held. This illustrates that the polyglycidaldehydes obtained by the present invention are easily cured.

*Example IV*

21 grams of glycidaldehyde was dissolved in 200 ml. benzene and the solution was placed in a tin can which had been previously flushed by dry nitrogen. 2 milliliters of 35% methanolic Triton B were added to the solution (Triton B is the trade name of a commercially available quaternary amine, i.e. benzyltrimethyl ammonium hydroxide). The mixture underwent an exothermic reaction which was kept below 30° C. with a water bath. After 48 hours, the precipitation which had formed was filtered from the benzene, washed with benzene and then further washed with ethanol. The washed precipitate was dried under vacuum to give 16.4 grams (17.8% yield) of a pale yellow solid which did not melt below 200° C. Analysis showed an epoxide value of 0.11, free carbonyl of 0.079, combined carbonyl of 0.158 and a hydroxyl value of 0.18. The example shows that quaternary amines are suitable for polymerizing glycidaldehyde. The example also illustrates the importance of conducting the polymerization under conditions which are comparatively dry and do not contain materials reactive with glycidaldehyde. In other words, the low epoxide value was caused by the methanol which was added together with the catalyst, and higher epoxide values are obtained when methanol is kept out of the reaction medium.

*Example V*

18 grams of glycidaldehyde and 0.3 gram of calcium hydroxide were mixed in a reactor and were allowed to stand at room temperature for 360 days. During this time, the solution became very pale yellow and increased in viscosity as time went on. At the end of 360 days, the almost solid viscous liquid was analyzed. Analysis showed 49.4% C, 6.2% H, and acidity of .004 equivalent per 100 grams, an ester value of 0.347, a carbonyl value (total) of 0.265 equivalent per 100 grams and an epoxide value of 0.69 equivalent per 100 grams.

*Example VI*

22.5 grams of glycidaldehyde and 1.0 gram of calcium hydroxide were mixed in a treated reactor and heated at 80° to 90° C. for 4 hours. The viscous solution was filtered to remove calcium hydroxide and pumped at 30° C. to subject the solution to one milliliter absolute pressure for two hours to remove unreacted aldehyde. The viscous liquid product remaining represented a 58.2% conversion and had an epoxide value of 0.82 equivalent per 100 grams as measured by back titration of a solution of magnesium chloride in hydrochloric acid, an epoxide equivalence of 0.76 when measured by similar use of HCl in dioxane, and a total carbonyl value of 0.38.

Examples V and VI illustrate that although the catalyst is rather slow in polymerizing glycidaldehyde unless heat is applied, and a highly viscous liquid is obtained which has exceptionally high functionality of the epoxide groups. These viscous liquids may be used for treating papers or textiles.

*Example VII*

7.2 grams glycidaldehyde and 0.25 gram of a mixture of lithium hydroxide and aluminum hydroxide in a 1:1 weight ratio are added to a reactor previously treated as in Example I, and held at room temperature for 6 months. The polymer obtained had an epoxy value of .397 equivalent per 100 grams, hydroxyl of 0.50 and carbonyl of 2.59.

*Example VIII*

Epoxy crotonaldehyde and pridine are brought together in accordance with the procedure of Example I. The material polymerizes to form a solid polymer which contains a high concentration of epoxy groups.

*Example IX*

A solution of 7.2 grams of glycidaldehyde, 54.4 grams of anisealdehyde and 0.2 ml. pyridine is added to a treated reactor and allowed to stand at room temperature for 48 hours. The mixture was then poured into 400 ml. of anhydrous ether to give a pale brown precipitate. The precipitation was filtered, washed and dried to give 10 grams of an amorphous polymer which decomposes at from 80–100° C. Analysis showed 52.0% C, 5.9% H, hydroxyl of 0.08, carbonyl (total) 0.04, and epoxy of 0.432 equivalent per 100 grams. The high epoxy value indicates that in spite of the anisealdehyde in the original mixture a fairly high proportion of the copolymer is due to glycidaldehyde units. Infrared analysis indicates that there was some copolymerization by the appearance of structures which are not found when glycidaldehyde is polymerized with pyridine alone.

*Example X*

A solution of glycidaldehyde, acetaldehyde and pyridine is formed and polymerized in accordance with the procedure of Example IX. Copolymers containing a moderately high concentration of epoxy groups (greater than 0.5 equivalent per 100 grams) are obtained.

I claim as my invention:

1. An epoxy-containing copolymer of 1 mol of an aldehyde having the formula

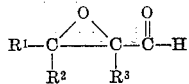

wherein $R^1$, $R^2$ and $R^3$ are selected from the class consisting of hydrogen atoms and $C_{1-8}$ alkyl groups, and 0.1–2.0 mols of a $C_{1-2}$ saturated aliphatic aldehyde, said copolymer being substantially polymerized through the aldehyde groups having at least 0.2 epoxy equivalent per 100 grams of copolymer.

2. An epoxy-containing copolymer of 1 mol glycidaldehyde and 0.1–2 mols of $C_{1-2}$ saturated aliphatic aldehyde, said copolymer being substantially polymerized through the aldehyde groups and having at least 0.5 epoxy equivalent per 100 grams of copolymer.

3. An epoxy-containing polymer of the group consisting of homopolymers of an aldehyde having the formula

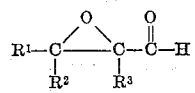

wherein $R^1$, $R^2$ and $R^3$ are selected from the class consisting of hydrogen atoms and $C_{1-8}$ alkyl groups, and copolymers of 1 mol of said aldehyde with 0.1–2 mols of a $C_{1-2}$ saturated aliphatic aldehyde, said polymers being substantially polymerized through the aldehyde groups and having at least 0.2 epoxy equivalent per 100 grams of polymer.

4. The polymer defined in claim 3 which is solid at 20° C.

5. The polymer defined in claim 4, in which one of the groups $R^1$, $R^2$ and $R^3$ is an alkyl group and the other two groups are hydrogen.

6. A homopolymer of glycidaldehyde having a molecular weight above about 300, said homopolymer being substantially polymerized through the aldehyde groups and containing epoxy groups in an amount such that the epoxy equivalence is greater than 0.5 equivalent per 100 grams of polymer.

7. The polymer defined in claim 6, in which the molecular weight is above 1000.

References Cited in the file of this patent

UNITED STATES PATENTS

| | | |
|---|---|---|
| 2,687,404 | Robertson | Aug. 24, 1954 |
| 2,887,498 | Hearne et al. | May 19, 1959 |
| 2,917,470 | Bressler et al. | Dec. 15, 1959 |